UNITED STATES PATENT OFFICE.

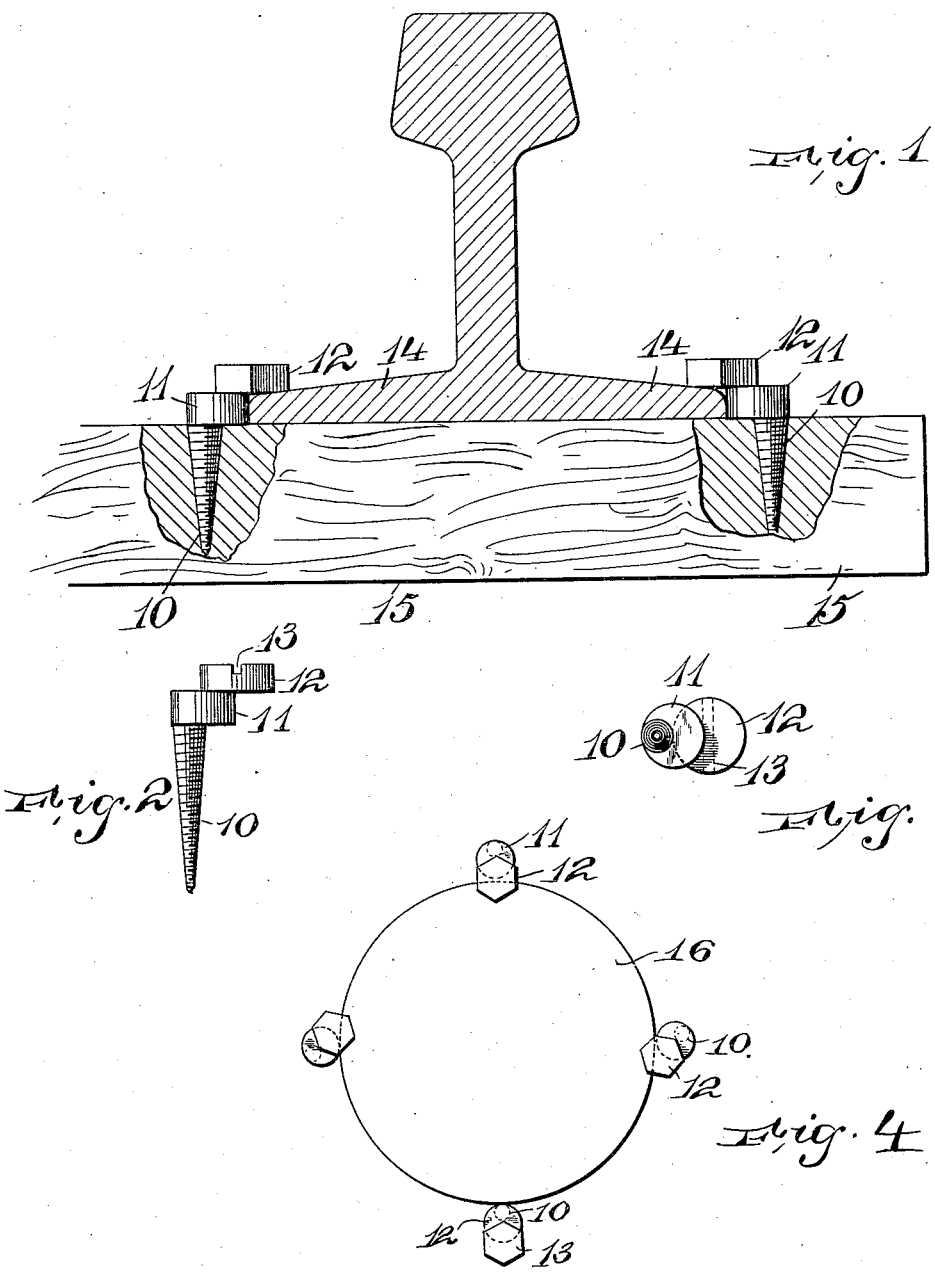

ALFRED D. HYDE, OF ISELIN, NEW JERSEY.

FASTENING DEVICE.

1,015,890.  Specification of Letters Patent.  Patented Jan. 30, 1912.

Application filed March 13, 1911. Serial No. 613,961.

*To all whom it may concern:*

Be it known that I, ALFRED D. HYDE, a citizen of the United States, residing at Iselin, in the county of Middlesex and State of New Jersey, have invented certain new and useful Improvements in Fastening Devices; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a fastening device which provides for a quick attachment and detachment of one element to another and at the same time to provide for an adjustment, the adjustment being brought about by a head which is arranged eccentrically on the shank of a screw or other rotatable element projecting from the head, the operation of the device, that is, the turning of it, being provided for by a head which projects from the collar by reason of being arranged eccentrically on the collar. The head has another function which is that of clamping the element adjusted by the collar so that it can not be removed in line with the screw or other shank, but providing for its quick release when the screw is given a half turn.

The invention is illustrated in the accompanying drawing, in which—

Figure 1 is a section showing how the device can be used for securing a railroad rail to a tie. Fig. 2 is a side view of the fastening device made in the form of a screw. Fig. 3 is a bottom view of Fig. 2, and Fig. 4 is a view illustrating how the device can be used for adjusting the article that is clamped by the screws so that it is movable transversely to the axes of the screws.

The invention consists of a shank 10 which is screw-threaded, being preferably screw-threaded from one end to the other, although the threads can be extended up from the point as far as desired for different uses to which the screw is to be put, that is, the different kinds of work it is to be used on. On the top of the shank 10 is a collar 11, which collar has a curved periphery, being preferably circular, and being arranged eccentrically on the shank 10 so that when the shank is turned the collar, on its periphery at the point farthest from the axis of the screw 10, has a considerable sweep or swing. Projecting from the collar is a head 12 which can be either made with a rectangular edge to provide means for turning it by a wrench, or it can be slotted as at 13 so that in the case of small screws it can be operated by means of a screw-driver. The head projects eccentrically from the collar, and preferably in extension of the eccentricity of the collar on the shank. It will thus be seen that the collar provides means for adjusting a device against which the collar bears, this adjustment varying as the screw is turned by means of the head, and the head, bearing on the top surface of the element adjusted by the collar, acts to clasp this element to the element in which the screw is seated. To illustrate this reference is made to Fig. 1 where the flanges 14 of a rail are secured by the screws that have been either driven or screwed into the tie 15. Any slight inequality in the width of the flange can be taken up by turning the screw and thus operating on the eccentric collar, the heads of the screws bearing on the top edges of the flanges to hold them tightly to the ties.

In Fig. 4 I illustrate a series of screws placed around an element 16 which is shown as circular, although other shapes can be employed, and the screws around the piece 16 are turned at different angles to show the adjustment that is possible. In centering work and in similar cases where fine adjustment is necessary, these screws have been found to be well adapted for the purpose. By turning the heads on opposite screws simultaneously the advancing of one eccentric collar and a retreating of the other will cause a shifting of the device or piece 16 so that it can be moved and then held so that it is fixed in position, and time is saved in the adjustment.

Having thus described my invention, what I claim is:—

1. A fastening device consisting of a shank, a collar having a curved surface, the curved surface being arranged eccentric to the axis of the shank, and a head eccentrically arranged on the collar adapted to extend therefrom in extension of the eccentricity of the collar leaving the side of the shank opposite the extension unobstructed.

2. A fastening device consisting of a screw-threaded shank, a collar eccentrically arranged on the shank, and a head eccentrically arranged on the collar and adapted to project in extension of the collar whereby none of either the shank, collar or head is concentric with another, the head having means thereon to provide for its operation by a tool.

3. A fastening device consisting of a screw-threaded shank, a circular collar arranged eccentrically on the shank, and a rectangular head on the collar and arranged eccentrically thereon in extension of the eccentricity of the collar whereby none of either the shank, collar or head is concentric with another.

In testimony that I claim the foregoing, I have hereunto set my hand this 10th day of March 1911.

ALFRED D. HYDE.

Witnesses:
WM. H. CAMFIELD,
M. A. JOHNSON.

Copies of this patent may be obtained for five cents each, by addressing the "Commissioner of Patents, Washington, D. C."